(12) United States Patent
Hayashi et al.

(10) Patent No.: US 12,006,402 B2
(45) Date of Patent: Jun. 11, 2024

(54) POLYROTAXANE, THERMALLY CURABLE COMPOSITION INCLUDING SAID POLYROTAXANE, THERMALLY CURED CROSSLINKED OBJECT, PRODUCTION METHOD FOR POLYROTAXANE, AND PRODUCTION METHOD FOR THERMALLY CURED CROSSLINKED OBJECT

(71) Applicant: ASM INC., Chiba (JP)

(72) Inventors: Yuki Hayashi, Chiba (JP); Katsunari Inoue, Chiba (JP); Masabumi Kudoh, Chiba (JP)

(73) Assignee: ASM Inc., Chiba (JP)

( * ) Notice: Subject to any disclaimer, the term of this patent is extended or adjusted under 35 U.S.C. 154(b) by 577 days.

(21) Appl. No.: 17/271,560

(22) PCT Filed: Aug. 26, 2019

(86) PCT No.: PCT/JP2019/033211
§ 371 (c)(1),
(2) Date: Feb. 25, 2021

(87) PCT Pub. No.: WO2020/045325
PCT Pub. Date: Mar. 5, 2020

(65) Prior Publication Data
US 2021/0179786 A1 Jun. 17, 2021

(30) Foreign Application Priority Data
Aug. 27, 2018 (JP) .................................. 2018-158334

(51) Int. Cl.
| C08G 83/00 | (2006.01) |
| C08G 63/91 | (2006.01) |
| C08G 65/08 | (2006.01) |
| C08J 3/24  | (2006.01) |

(52) U.S. Cl.
CPC ......... C08G 83/007 (2013.01); C08G 63/912 (2013.01); C08G 65/08 (2013.01); C08J 3/24 (2013.01); *C08J 2367/04* (2013.01)

(58) Field of Classification Search
CPC ......... C08G 83/007; C08G 63/912; C08J 3/24
See application file for complete search history.

(56) References Cited

U.S. PATENT DOCUMENTS

| 2009/0312491 A1 | 12/2009 | Ito et al. |
| 2011/0124823 A1 | 5/2011 | Hayashi et al. |
| 2015/0094463 A1 | 4/2015 | Oomori et al. |
| 2016/0304689 A1 * | 10/2016 | Takemoto .......... C08G 18/4009 |
| 2016/0304690 A1 | 10/2016 | Takemoto et al. |
| 2018/0371199 A1 | 12/2018 | Hayashi et al. |
| 2019/0345294 A1 * | 11/2019 | Hayashi ................ C08F 290/10 |

FOREIGN PATENT DOCUMENTS

| EP | 2123681 A1 | 11/2009 |
| EP | 2787010 A1 | 10/2014 |
| EP | 3064513 A1 | 9/2016 |
| EP | 3081582 A1 | 10/2016 |
| EP | 3327052 A1 | 5/2018 |
| EP | 3345954 A1 | 11/2018 |
| EP | 3527610 A1 | 8/2019 |
| EP | 3572202 A1 | 11/2019 |
| JP | 2011-046917 A | 3/2011 |
| JP | 2012-144591 A | 8/2012 |
| JP | 2013-209586 A | 10/2013 |
| JP | 2016-069398 A | 5/2016 |
| JP | 2016-204434 A | 12/2016 |
| JP | 2017-057269 A | 3/2017 |
| JP | 2017-110211 A | 6/2017 |
| JP | 2017-171834 A | 9/2017 |
| WO | 2005080470 A1 | 1/2005 |
| WO | 2010/024431 A1 | 3/2010 |
| WO | 2013/099842 A1 | 7/2013 |
| WO | 2015/174187 A1 | 11/2015 |
| WO | 2017/130998 A1 | 8/2017 |
| WO | 2017/187783 A1 | 11/2017 |
| WO | 2018/074404 A1 | 4/2018 |
| WO | 2018135523 A1 | 7/2018 |

OTHER PUBLICATIONS

Extended European Search Report dated Apr. 7, 2022, issued in corresponding Application No. EP19855026, filed Aug. 26, 2019, 12 pages.
JP Office Action dated Oct. 17, 2023 for JP Pat. App. No. 2020-539431. 3 pages.

* cited by examiner

Primary Examiner — Mark S Kaucher
(74) Attorney, Agent, or Firm — Christensen O'Connor Johnson Kindness PLLC

(57) ABSTRACT

The present invention provides a polyrotaxane for obtaining a material combining a higher degree of elongation with a higher breaking strength and/or a polyrotaxane having properties not possessed by conventional polyrotaxanes, such as compatibility with compounds to be used in a material, solubility in solvents, and functionality. The polyrotaxanes of the present invention each comprise: a pseudo-polyrotaxane comprising cyclic molecules and a linear molecule which passes through the cavities of the cyclic molecules to form a clathrate; and blocking groups disposed at both ends of the pseudo-polyrotaxane so that the cyclic molecules are not released. The cyclic molecules each include a hydroxyl-inactivation group and a hydroxyl group bonded by a spacer group. The polyrotaxanes have a hydroxyl value of 10-65 mg-KOH/g.

20 Claims, No Drawings

POLYROTAXANE, THERMALLY CURABLE COMPOSITION INCLUDING SAID POLYROTAXANE, THERMALLY CURED CROSSLINKED OBJECT, PRODUCTION METHOD FOR POLYROTAXANE, AND PRODUCTION METHOD FOR THERMALLY CURED CROSSLINKED OBJECT

TECHNICAL FIELD

The present invention relates to a polyrotaxane having a hydroxyl value of 10 to 65 mgKOH/g, a thermosetting composition comprising the polyrotaxane, and a thermoset crosslinked body formed from the composition.

Further, the present invention relates to a method for producing a polyrotaxane having a hydroxyl value of 10 to 65 mgKOH/g, and a method for producing a thermoset crosslinked body.

BACKGROUND ART

A polyrotaxane comprising capping groups each locating at each end of a pseudopolyrotaxane, which has a linear molecule and a cyclic molecule(s) in which the linear molecule is included in a cavity (cavities) of the cyclic molecule(s) in a skewered manner, in order to prevent the dissociation of the cyclic molecule(s), has been expected to be used in various materials, since the materials can have excellent elongation, excellent flexibility and the like.

For example, Patent Document 1 discloses a material which is formed by crosslinking first and second polyrotaxanes through a cyclic molecule(s), is free from solvent and has a stress at the 50% strain of 2.0 MPa or less. The document discloses that the material shows excellent elongation and a small initial elastic modulus (Young's modulus).

Further, Patent Document 2 discloses a polyrotaxane in which a part of hydroxyl groups is substituted with —$OCH_2$—CH(R)—OH groups. The document also discloses that a crosslinked body obtained by using a polyrotaxane in which a part of hydroxyl groups is substituted with an ε-caprolactone copolymer group can exhibit excellent flexibility.

Patent Document 3 discloses a polyurethane resin formed from a polycarbonate polyol having an alicyclic structure in the main chain thereof, an isocyanate, and a polyrotaxane.

PRIOR ART DOCUMENT

Patent Document
 Patent Document 1: WO2010/024431.
 Patent Document 2: WO2013/099842.
 Patent Document 3: WO2015/174187.

DISCLOSURE OF THE INVENTION

Problems to be Solved by the Invention

However, a material having both of a larger degree of elongation and higher breaking strength by using the properties of a polyrotaxane has been demanded. In order to meet the demand, it has been required to modify the properties of polyrotaxanes and to design the molecules of the polyrotaxanes for the modification.

Further, for some applications, properties which the conventional polyrotaxanes do not possess, such as compatibility with other compounds to be used in a material, solubility in solvents, and functionalities have been required.

More, in some applications, it has been required to reduce the amount of hydroxyl groups in a polyrotaxane to minimize the influence of the hydroxyl groups.

An object of the present invention is to provide a polyrotaxane which can meet the above-described requirements.

Specifically, an object of the present invention is to provide a polyrotaxane for obtaining a material having both of a larger degree of elongation and higher breaking strength.

Further, an object of the present invention is, other than or in addition to the above objects, to provide a polyrotaxane having properties that the conventional polyrotaxanes do not possess, such as compatibility with other compounds to be used in a material, solubility in solvents, and functionalities.

More, an object of the present invention is, other than or in addition to the above objects, to provide a polyrotaxane in which the influence of hydroxyl groups can be minimized.

An object of the present invention is, other than or in addition to the above objects, to provide a thermosetting composition comprising the above-described polyrotaxane.

Further, an object of the present invention is, other than or in addition to the above objects, to provide a thermoset crosslinked body obtained by using the above-described polyrotaxane.

An object of the present invention is, other than or in addition to the above objects, to provide a method for producing the above-described polyrotaxane.

Further, an object of the present invention is, other than or in addition to the above objects, to provide a method for producing a thermoset crosslinked body by using the above-described polyrotaxane.

Specifically, the present inventors have found the following inventions:

<1> A polyrotaxane comprising capping groups each locating at each end of a pseudopolyrotaxane, which has a linear molecule and a cyclic molecule(s) in which the linear molecule is included in a cavity (cavities) of the cyclic molecule(s) in a skewered manner, in order to prevent the dissociation of the cyclic molecule(s), wherein the cyclic molecule comprises a group having an ability to inactivate a hydroxyl group and a hydroxyl group via a spacer group, and the polyrotaxane has a hydroxyl value of 10 to 65 mgKOH/g, preferably 20 to 63 mgKOH/g, more preferably 40 to 60 mgKOH/g.

<2> In the above item <1>, the spacer group may have a group derived from polycaprolactone.

<3> In the above item <1> or <2>, the spacer group may have a group derived from hydroxypropyl.

<4> In any one of the above items <1> to <3>, the group having an ability to inactivate a hydroxyl group may be bound to the cyclic molecular via the spacer group.

<5> In any one of the above items <1> to <3>, the group having an ability to inactivate a hydroxyl group may be bound directly to the cyclic molecular.

<6> In any one of the above items <1> to <5>, the group having an ability to inactivate a hydroxyl group may be selected from the group consisting of alkyl ester groups, alkyl carbamoyl groups, and alkyl ether groups (an alkyl group of each groups independently represents a linear, branched or cyclic alkyl group having 1 to 12, preferably 2 to 10, more preferably 4 to 8 carbon atoms). The group having an ability to inactivate a hydroxyl group may be preferably alkyl ester groups or alkyl carbamoyl groups, more preferably alkyl carbamoyl groups.

<7> A thermosetting composition comprising:

A) a polyrotaxane comprising capping groups each locating at each end of a pseudopolyrotaxane, which has a linear molecule and a cyclic molecule(s) in which the linear molecule is included in a cavity (cavities) of the cyclic molecule(s) in a skewered manner, in order to prevent the dissociation of the cyclic molecule(s), wherein the cyclic molecule comprises a group having an ability to inactivate a hydroxyl group and a hydroxyl group bonded through a spacer group, and the polyrotaxane has a hydroxyl value of 10 to 65 mgKOH/g, preferably 20 to 63 mgKOH/g, more preferably 40 to 60 mgKOH/g; and B) a material which is capable of reacting with the hydroxyl group of the A) polyrotaxane to cure.

<8> In the above item <7>, an amount of the (A) polyrotaxane may be 2 to 35% by weight, preferably 5 to 30% by weight, more preferably 10 to 25% by weight, based on 100% by weight of the total nonvolatile components of the composition.

<9> In the above item <7> or <8>, the spacer group may have a group derived from polycaprolactone.

<10> In any one of the above items <7> to <9>, the spacer group may further have a group derived from hydroxypropyl.

<11> In any one of the above items <7> to <10>, the group having an ability to inactivate a hydroxyl group may be bound to the cyclic molecular via the spacer group.

<12> In any one of the above items <7> to <11>, the group having an ability to inactivate a hydroxyl group may be bound directly to the cyclic molecular.

<13> In any one of the above items <7> to <12>, the group having an ability to inactivate a hydroxyl group may be selected from the group consisting of alkyl ester groups, alkyl carbamoyl groups, and alkyl ether groups (an alkyl group of each groups independently represents a linear, branched or cyclic alkyl group having 1 to 12, preferably 2 to 10, more preferably 4 to 8 carbon atoms). The group having an ability to inactivate a hydroxyl group may be preferably alkyl ester groups or alkyl carbamoyl groups, more preferably alkyl carbamoyl groups.

<14> In any one of the above items <7> to <13>, the B) material may comprise a a) first compound having a number average molecular weight of 350 or more, preferably 500 or more, more preferably 600 or more, and having at least two reactive groups selected from an isocyanate group, an isothiocyanate group, a carboxylic acid group, and a carboxylic anhydride group.

<15> In any one of the above items <7> to <14>, the B) material may comprise a a) second compound having a number average molecular weight of 350 or more, preferably 400 or more, more preferably 500 or more, and having at least two groups selected from a hydroxyl group, an amino group, and a thiol group.

<16> In the above item <15>, the composition may further comprise C) a crosslinking agent.

<17> In the above item <15> or <16>, the 2) second compound may be a polyol having two or more hydroxyl groups, and the C) crosslinking agent may have two or more isocyanate groups.

<18> A thermoset crosslinked body formed from the composition according to any one of the above items <7> to <17>.

<19> In the above item <18>, the thermoset crosslinked body may have i) 500% or more, preferably 650% or more, more preferably 800% or more of the elongation rate; and ii) the tensile break strength, which is 5.0 times or more, preferably 9 times or more, more preferably 12 times or more of the stress at the 100% elongation.

<20> A method for producing a polyrotaxane, comprising the steps of:

a) preparing a polyrotaxane, in which capping groups each locates at each end of a pseudopolyrotaxane, which has a linear molecule and a cyclic molecule(s) having a hydroxyl group(s) in which the linear molecule is included in a cavity (cavities) of the cyclic molecule(s) in a skewered manner, in order to prevent the dissociation of the cyclic molecule(s), b) mixing and reacting a compound, which serves as a source of a group having an ability to inactivate a hydroxyl group that is converted to a group having an ability to inactivate a hydroxyl group, to and with the polyrotaxane to inactivate a part of the hydroxyl group (s);

to obtain a polyrotaxane having a hydroxyl value of 10 to 65 mgKOH/g, preferably 20 to 63 mgKOH/g, more preferably 40 to 60 mgKOH/g.

<21> In the step a) of the above item <20>, the hydroxyl group may be directly bound to the cyclic molecule(s); and the method may further comprise, after the step b), the step of c) adding and reacting a compound which reacts with a hydroxyl group other than a part of the hydroxyl groups and which becomes a source of the first spacer group and the hydroxyl group, to the system having the polyrotaxane obtained in the step b), to introduce the first spacer group and the hydroxyl group bound to the first spacer group, thereby to obtain the polyrotaxane having a hydroxyl value of 10 to 65 mgKOH/g, preferably 20 to 63 mgKOH/g, more preferably 40 to 60 mgKOH/g.

<22> In the above item <21>, the first spacer group may have a group derived from polycaprolactone.

<23> In the above item <21> or <22>, the first spacer group may have a group derived from polycaprolactone and a group derived from hydroxypropyl.

<24> In the step a) of the above item <20>, the hydroxyl group may be bound to the cyclic molecule via a second spacer group.

<25> In the above item <24>, the method may further comprise, after the step b), the step of c) adding and reacting a compound which reacts with a hydroxyl group other than a part of the hydroxyl groups and which becomes a source of a third spacer group and the hydroxyl group, to the system having the polyrotaxane obtained in the step b), to introduce the first spacer group and the hydroxyl group bound to the first spacer group, thereby to obtain the polyrotaxane having a hydroxyl value of 10 to 65 mgKOH/g.

<26> In the above item <25>, the second spacer group may have a group derived from hydroxypropyl, and the third spacer group may have a group derived from polycaprolactone.

<27> In the above item <24>, the second spacer group may have a group derived from polycaprolactone.

<28> In the above item <24>, the second spacer group may have a group derived from hydroxypropyl and a group derived from polycaprolactone.

<29> A method for producing a thermoset crosslinked body, comprising the step of:
d) mixing the polyrotaxane obtained by the method according to any one of the above items <20> to <28> with a material which reacts with a hydroxyl group(s) of the polyrotaxane, to cure, and reacting the resultant by applying heat;
to obtain the thermoset crosslinked body.
<30> In the above item <29>, the thermoset crosslinked body may have
i) 500% or more, preferably 650% or more, more preferably 800% or more of the elongation rate; and
ii) the tensile break strength, which is 5.0 times or more, preferably 9 times or more, more preferably 12 times or more of the stress at the 100% elongation.

Effects of the Invention

The present invention can provide a polyrotaxane for obtaining a material having both of a larger degree of elongation and higher breaking strength.

Further, the present invention can provide, other than or in addition to the above effect, a polyrotaxane having properties that the conventional polyrotaxanes do not possess, such as compatibility with other compounds to be used in a material, solubility in solvents, and functionalities.

More, the present invention can provide, other than or in addition to the above effect, to provide a polyrotaxane in which the influence of hydroxyl groups can be minimized.

The present invention can provide, other than or in addition to the above effects, a thermosetting composition comprising the above-described polyrotaxane.

Further, the present invention can provide, other than or in addition to the above effects, a thermoset crosslinked body obtained by using the above-described polyrotaxane.

The present invention can provide, other than or in addition to the above effects, a method for producing the above-described polyrotaxane.

Further, the present invention can provide, other than or in addition to the above effect, a method for producing a thermoset crosslinked body by using the above-described polyrotaxane.

EMBODIMENTS FOR CARRYING OUT THE INVENTION

Hereinafter, the present invention described herein will be described in detail.

The present application discloses a polyrotaxane having a hydroxyl value of 10 to 65 mgKOH/g, a thermosetting composition comprising the polyrotaxane, and a thermoset crosslinked body formed from the composition.

Further, the present invention discloses a method for producing a polyrotaxane having a hydroxyl value of 10 to 65 mgKOH/g, and a method for producing a thermoset crosslinked body. Hereinafter, the present invention will be described in detail in order.

<Polyrotaxane Having a Hydroxyl Value of 10 to 65 mgKOH/g>

The present application discloses a polyrotaxane having a hydroxyl value of 10 to 65 mgKOH/g.

Specifically, the present application discloses a polyrotaxane comprising capping groups each locating at each end of a pseudopolyrotaxane, which has a linear molecule and a cyclic molecule(s) in which the linear molecule is included in a cavity (cavities) of the cyclic molecule(s) in a skewered manner, in order to prevent the dissociation of the cyclic molecule(s),
wherein the cyclic molecule comprises a group having an ability to inactivate a hydroxyl group and a hydroxyl group via a spacer group, and the polyrotaxane has a hydroxyl value of 10 to 65 mgKOH/g, preferably 20 to 63 mgKOH/g, more preferably 40 to 60 mgKOH/g.

<<Spacer Group>>

The spacer group is not particularly limited, as long as the spacer group is a group capable of binding the cyclic molecule(s) in the polyrotaxane to the hydroxyl group.

The spacer group may comprise the hydroxyl group via the spacer group, and thus the spacer group can provide an activity to improve the compatibility of the polyrotaxane with other material, an activity to improve the solubility of the polyrotaxane in a solvent, an activity to improve the compatibility of the polyrotaxane with various solvents, or an effect to allow a hydroxyl group provided via the spacer group to act as a crosslinking point to the polyrotaxane.

The spacer group may have a group derived from polycaprolactone. Alternatively, or in addition, the spacer group may have a group derived from hydroxypropyl.

Examples of the form of the impartment of the hydroxyl group to the cyclic molecules via the spacer group may include, but are not limited to, a form in which a hydroxyl group is provided via the spacer group of an alkylene group such as a 1-hydroxypropyl group, a 2-hydroxypropyl group or a hydroxybutyl group; and a form in which a hydroxyl group is provided via a spacer group such as a polyethylene glycol group, a polypropylene glycol group, a polycaprolactone group and a polylactide group.

The spacer group may be preferably a polyethylene glycol group, a polypropylene glycol group, a polycaprolactone group or a polylactide group.

<<Hydroxyl Value>>

A hydroxyl value of the polyrotaxane according to the present application may be 10 to 65 mgKOH/g, preferably 20 to 63 mgKOH/g, more preferably 40 to 60 mgKOH/g.

The hydroxyl value described herein represents an amount of active hydroxyl groups measured in accordance with JIS K 00701, the unit thereof is "mgKOH/g", unless otherwise noted herein.

In the polyrotaxane of the present invention, a hydroxyl group(s) each provided via the spacer group can serve as an active hydroxyl group(s).

In general, higher hydroxyl value can provide a crosslinked body, which is obtained by using the raw material having higher hydroxyl value, having a larger crosslinking density, and thus having larger influence on the mechanical properties of the crosslinked body. In general, higher crosslinking density can provide improved strength and improved elastic modulus of the crosslinked body, but decreased elongation rate of the crosslinked body. On the other hand, in general, lower hydroxyl value can provide lower crosslinking density of the crosslinked body and higher elongation rate of the crosslinked body, but decreased elastic modulus and decreased breaking strength of the crosslinked body.

Further, in particular, in applications for which hydrophobic properties are required, such as electrical and electronic components and engineering, excessive hydroxyl groups which are not involved in crosslinking may cause the absorption of moisture. Therefore, the body not having excessive hydroxyl groups can reduce the influence of the hydroxyl groups such as the absorption of moisture and the like.

In the present application, the crosslinked body obtained by using the polyrotaxane can achieve excellent mechanical properties such as the elongation rate, an elastic modulus and breaking strength, and thus it is preferred to employ the above-described ranges. Using the polyrotaxane according to the present invention can produce a tough material which has a relatively lower elastic modulus and higher strength (i.e., the ratio of the strength to the elastic modulus is larger) with a higher elongation rate.

<<A Group Having an Ability to Inactivate a Hydroxyl Group>>

The cyclic molecule in the polyrotaxane according to the present application may comprise a group having an ability to inactivate a hydroxyl group that is an inactivated hydroxyl group.

The group having an ability to inactivate a hydroxyl group can prevent an excess of active hydroxyl groups in the polyrotaxane to achieve the above-described hydroxyl value, and therefore can exert an effect to design the molecule of the polyrotaxane having desired properties.

The group having an ability to inactivate a hydroxyl group may be provided in the cyclic molecule(s) in any one of the following forms i) to iv), depending on the method for producing the polyrotaxane of the present application:

i) In a case where an active hydroxyl group(s) is/are bound directly to the cyclic molecules, the group(s) having an ability to inactivate a hydroxyl group is/are produced by inactivating a part of the hydroxyl groups.

ii) In a case where a first spacer group is bound to the cyclic molecule(s) and an active hydroxyl group(s) is/are located at an end of the first spacer group, the group(s) having an ability to inactivate a hydroxyl group(s) is/are produced by inactivating a part of the hydroxyl groups.

iii) In a case where a first spacer group and a second spacer group are bound to the cyclic molecule(s) in order of the first spacer group and the second spacer group as observed from the cyclic molecule and an active hydroxyl group is located at an end of the second spacer group, the group(s) having an ability to inactivate a hydroxyl group(s) is/are produced by inactivating a part of the hydroxyl groups.

iv) An arbitrary combination of the above-described forms i) to iii).

The group having an ability to inactivate a hydroxyl group is not particularly limited, as long as the group having an ability to inactivate a hydroxyl group has an activity to inactivate an active hydroxyl group.

Examples of the group having an ability to inactivate a hydroxyl group may include, but are not limited to, alkyl ester groups, alkylcarbamoyl groups and alkyl ether groups (an alkyl group in each groups independently represents a linear, branched or cyclic alkyl group having 1 to 12, preferably 2 to 10, more preferably 4 to 8, carbon atoms).

Specific examples of the group having an ability to inactivate a hydroxyl group may include an acetyl group, a propionyl group, a butyl ester group, an octyl ester group, a cyclohexylcarboxyl group, a butyl carbamoyl group, a cyclopentyl carbamoyl group, a cyclohexyl carbamoyl group, a hexyl carbamoyl group, a dodecyl carbamoyl group, an ethylhexyl carbamoyl group, a butoxy group, a hexyloxy group, and the like.

The group having an ability to inactivate a hydroxyl group may be preferably alkyl ester groups or alkylcarbamoyl groups, more preferably alkylcarbamoyl groups. More specifically, the group having an ability to inactivate a hydroxyl group may be preferably a butyl carbamoyl group, a cyclohexyl carbamoyl group, an ethylhexyl carbamoyl group or a dodecyl carbamoyl group, more preferably a butyl carbamoyl group or a cyclohexyl carbamoyl group.

The "cyclic molecule", the "liner molecule", and "capping group", each of which constitutes the polyrotaxane, will be described hereinafter. Furthermore, conventionally known material may be used for them.

<<Cyclic Molecule>>

The cyclic molecule of the polyrotaxane according to the present invention is not limited as long as the cyclic molecule may be cyclic, and may have a cavity, and a linear molecule is included in the cavity (cavities) of the cyclic molecules in a skewered manner.

The cyclic molecule comprises the hydroxyl group via the above-described spacer. Further, the cyclic molecule may have the group(s) having an ability to inactivate a hydroxyl group(s).

The cyclic molecule may comprise other groups other than the above-described groups. For example, other groups other than the above-described groups may be, but are not limited to, a phenyl group, a benzyl carbamoyl group, a phenyl ethyl carbamoyl group, a benzyl ester group, butyl benzyl ester group and the like.

The cyclic molecule may be, for example, selected from the group consisting of α-cyclodextrin, β-cyclodextrin and γ-cyclodextrin.

For example, a part of —OH groups in α-cyclodextrin and the like may be substituted with the above-described spacer group, and/or the above-described group having an ability to inactivate a hydroxyl group, or other groups other than the above-described groups.

<<Linear Molecule>>

The linear molecule of the polyrotaxane according to the present invention is not limited as long as the linear molecule may be included in a cavity (cavities) of the cyclic molecule(s) in a skewered manner.

For example, the linear molecule may include polyvinyl alcohol, polyvinylpyrrolidone, poly(meth)acrylic acid, cellulose-based resins (carboxymethylcellulose, hydroxyethylcellulose, hydroxypropylcellulose and the like), polyacrylamide, polyethylene oxide, polyethylene glycol, polypropylene glycol, polyvinyl acetal-based resins, polyvinyl methyl ether, polyamine, polyethyleneimine, casein, gelatin, starch and the like and/or copolymers thereof, polyolefin-based resins such as polyethylene, polypropylene, and copolymer resins with other olefinic monomers, polyester resins, polyvinyl chloride resins, polystyrene-based resins such as polystyrene, acrylonitrile-styrene copolymer resin and the like, acrylic resins such as polymethyl methacrylate, copolymer of (meth)acrylate, acrylonitrile-methyl acrylate copolymer resin and the like, polycarbonate resins, polyurethane resins, vinyl chloride-vinyl acetate copolymer resin, polyvinylbutyral resin and the like; and derivatives and modifications thereof, polyisobutylene, polytetrahydrofuran, polyaniline, acrylonitrile-butadiene-styrene copolymer (ABS resin), polyamides such as nylon and the like, polyimides, polydienes such as polyisoprene, polybutadiene and the like, polysiloxanes such as polydimethylsiloxane and the like, polysulfones, polyimines, polyacetic anhydrides, polyureas, polysulfides, polyphosphazenes, polyketones, polyphenylenes, polyhaloolefins, and derivatives thereof. For example, the linear molecule may be selected from the group consisting of polyethylene glycol, polyisoprene, polyisobutylene, polybutadiene, polypropylene glycol, polytetrahydrofuran, polydimethylsiloxane, polyethylene, polypropylene, polyvinyl alcohol and polyvinyl methyl ether. In particular, the linear molecule may be polyethylene glycol.

A weight average molecular weight of the linear molecule may be 1,000 or more, preferably 3,000 to 100,000, more preferably 6,000 to 50,000.

In the polyrotaxane of the present application, the combination of (cyclic molecule, linear molecule) may be (one derived from α-cyclodextrin, one derived from polyethylene glycol).

<<Capping Group>>

The capping group of the polyrotaxane according to the present invention is not limited, as long as the group is located at both ends of a pseudopolyrotaxane, and the group has a function of preventing dissociation of a cyclic molecule(s) from a linear molecule.

For example, the capping group may be selected from the group consisting of dinitrophenyl groups; cyclodextrins; adamantane groups; trityl groups; fluoresceins; silsesquioxanes; pyrenes; substituted benzenes (example of the substituent may include, but are not limited to, alkyl, alkyloxy, hydroxy, halogen, cyano, sulfonyl, carboxyl, amino, phenyl and the like. The substituent may be single or plural.); polycyclic aromatics which may be substituted (examples of the substituent may include, but are not limited to, those described above. The substituent may be single or plural.); and steroids. Preferably, the capping group may be selected from the group consisting of dinitrophenyl groups; cyclodextrins; adamantane groups; trityl groups; fluoresceins; silsesquioxanes; and pyrenes, more preferably adamantane groups or cyclodextrins.

<Thermosetting Composition>

The present application provides a thermosetting composition using the above-described polyrotaxane.

Specifically, the present application discloses a thermosetting composition comprising:

A) a polyrotaxane comprising capping groups each locating at each end of a pseudopolyrotaxane, which has a linear molecule and a cyclic molecule(s) in which the linear molecule is included in a cavity (cavities) of the cyclic molecule(s) in a skewered manner, in order to prevent the dissociation of the cyclic molecule(s),
wherein the cyclic molecule comprises a group having an ability to inactivate a hydroxyl group and a hydroxyl group bonded through a spacer group, and the polyrotaxane has a hydroxyl value of 10 to 65 mgKOH/g, preferably 20 to 63 mgKOH/g, more preferably 40 to 60 mgKOH/g; and
B) a material which is capable of reacting with the hydroxyl group of the A) polyrotaxane to cure.

Furthermore, for the A) polyrotaxane in the thermosetting composition, the above-described polyrotaxane is used.

An amount of the polyrotaxane A) may be 2 to 35% by weight, preferably 5 to 30% by weight, more preferably 10 to 25, based on 100% by weight of the total involatile components in the thermosetting composition.

The thermosetting composition comprises the above-described polyrotaxane A) in the above 1) and the above-described material B) in the above 2), and may further comprise other components.

The other components may include, but are not limited to, curing catalysts, antioxidant agents, ultraviolet ray absorbers, flame retardants, fillers, fibers, viscosity modifiers, foaming agents, chain extenders, and organic solvents, depending on the properties of the A) polyrotaxane used, the properties of the B) material used, applications of the thermosetting composition and the like.

<<B) Material Capable of Reacting with Hydroxyl Groups in Polyrotaxane A) to Cure>>

The material B) in the thermosetting composition is not particularly limited, as long as the material can react with hydroxyl groups in the polyrotaxane A) to cure the composition. The term "hydroxyl group" as used herein refers to a hydroxyl group which binds to the cyclic molecule(s) via the spacer group.

Examples of the material B) may include i) a material capable of directly reacting with a hydroxyl group, and ii) a material capable of reacting with a hydroxyl group in the presence of other compound (wherein the material is also referred to as a "material capable of indirectly reacting with a hydroxyl group" used herein). Either one or both of the above-described materials i) and ii) may be used.

<<i) Material Capable of Directly Reacting with a Hydroxyl Group>>

The material is not particularly limited, as long as the material has a reactive group capable of reacting with a hydroxyl group as a part of the structure thereof.

Examples of the material may include, but are not limited to, polycarbonates with terminal isocyanate modification, polypropylene glycol with terminal isocyanate modification, a polyacryl ester having an isocyanate side chain, polycarbonates with terminal isothiocyanate modification, a polyacrylic acid ester having an isothiocyanate group in a side chain, an acid-anhydride-modified polypropylene, polyethylene glycol with terminal epoxy-modification, and acryl polymers modified with carboxylic acid group.

The material may have a number average molecular weight of 350 or more, preferably 500 or more, more preferably 600 or more.

The material i) capable of directly reacting with a hydroxyl group may comprise a) a first compound having a number average molecular weight of 350 or more, preferably 500 or more, more preferably 600 or more, and having at least two reactive groups selected from an isocyanate group, an isothiocyanate group, a carboxylic acid group and a carboxylic acid anhydride group.

<<ii) Material Capable of Reacting with a Hydroxyl Group in the Presence of Other Compound>>

Another example of the material B) is a material which does not directly react with nor bind to hydroxyl groups in the polyrotaxane, but can bind to the hydroxyl groups in the presence of other compound, for example in the presence of a crosslinking agent, via the crosslinking agent.

Examples of the material may include, but are not limited to, a polycarbonate diol, a polypropylene glycol, a polyethylene glycol, a polypropylenediamine, polypropylene with terminal thiol group modification, polyacrylic acid esters each having a thiol group in a side chain, acrylic acid esters each having an amino group in a side chain, and a polypropylene having a thiol group and a hydroxyl group at ends thereof.

The material may have a number average molecular weight of 350 or more, preferably 400 or more, more preferably 500 or more.

Examples of the crosslinking agent used herein may include, but are not limited to, a polyisocyanate compound such as hexamethylene diisocyanate, phenylene diisocyanate, triethylene diisocyanate, isophorone diisocyanate, biuret-type polyisocyanate, isocyanurate-type polyisocyanate and adduct-type polyisocyanate; a diacid anhydride such as pyromellitic acid anhydride, 4,4'-carbonyldiphthalic acid anhydride, cyclohexanetetracarboxylic acid dianhydride, and 4,4'-oxydiphthalic acid anhydride; and a polyfunctional acid chloride compound such as terephthaloyl dichloride, isophthaloyl dichloride and 1,3,5-benzenetricarbonyl trichloride.

Preferably, the material ii) capable of reacting with hydroxyl groups in the presence of other compound may comprise a second compound having a number average molecular weight of 350 or more and having at least two groups selected from a hydroxyl group, an amino group and a thiol group. In particular, the second compound may be a polyol having at least two hydroxyl groups, and the crosslinking agent may have at least two isocyanate groups.

The material B) may comprise a single type of material, or may comprise a plurality of types of materials. For example, a material capable of reacting directly with a hydroxyl group in the polyrotaxane, a material capable of reacting with hydroxyl groups in the polyrotaxane via a crosslinking agent and the crosslinking agent may be included in a single composition.

<Thermoset Crosslinked Body>

The present application discloses a thermoset crosslinked body, in particular a thermoset crosslinked body formed from the thermosetting composition.

The thermoset crosslinked body may be in a form of film, sheet, plate or three-dimensional molded object.

As the method for forming the thermoset crosslinked body, any one of the conventional known methods may be employed. Examples of the method may include, but are not limited to, a method comprising the step of applying a solution of the composition onto a substrate, to form a film, followed by heating the film to cure; and a method comprising the step of injecting the composition into a mold having a specific shape, followed by heating the composition to cure, and then removing the cured body from the mold. An organic solvent may be used, depending on applications used and the production method employed.

The thermoset crosslinked body may have the following properties associated with the above-described polyrotaxane:
  i) 500% or more, preferably 650% or more, more preferably 800% or more of the elongation rate; and
  ii) the tensile break strength, which is 5.0 times or more, preferably 9 times or more, more preferably 12 times or more of the stress at the 100% elongation.

<Method for Producing a Polyrotaxane Having a Hydroxyl Value of 10 to 65 mgKOH/g>

The present application discloses a method for producing the above-described polyrotaxane, specifically a polyrotaxane having a hydroxyl value of 10 to 65 mgKOH/g, preferably 20 to 63 mgKOH/g, more preferably 40 to 60 mgKOH/g.

The method comprises the step of:
  a) preparing a polyrotaxane, in which capping groups each locates at each end of a pseudopolyrotaxane, which has a linear molecule and a cyclic molecule(s) having a hydroxyl group(s) in which the linear molecule is included in a cavity (cavities) of the cyclic molecule(s) in a skewered manner, in order to prevent the dissociation of the cyclic molecule(s); and
  b) mixing and reacting a compound, which serves as a source of a group having an ability to inactivate a hydroxyl group that is converted to a group having an ability to inactivate a hydroxyl group, to and with the polyrotaxane to inactivate a part of the hydroxyl group(s); to obtain the above-described polyrotaxane.

The following two process can be used, depending on the type of "the cyclic molecules each having a hydroxyl group" used in step a):

i) A case where the "hydroxyl group" is an active hydroxyl group and the hydroxyl group is directly bonded to each of the cyclic molecules. In the case, a part of the hydroxyl groups directly bound to the cyclic molecule(s) are inactivated in the step b), to form a group(s) having an ability to inactivate a hydroxyl group(s). On the other hand, with respect to hydroxyl groups that are not inactivated, the method may comprise the step c) adding and reacting a compound that can react with the hydroxyl groups that are not inactivated and that can serve as a source of the first spacer group and the hydroxyl group, to and with a system comprising the polyrotaxane produced in the above-described step b), to introduce the first spacer group and the hydroxyl group bound to the first spacer group, thereby to obtain a polyrotaxane having a hydroxyl value having the above-described range.

In the method i), a part of the active hydroxyl groups that bind directly to the cyclic molecules are inactivated, and thus an amount of the "hydroxyl group via the spacer group" which is formed thereafter can be reduced, and the hydroxyl value can be adjusted to the value having the above-described range.

With respect to the "source of the first spacer group" and the "first spacer group" described above, the introduction of the "first spacer group" may be carried out by a single step to introduce a single type of the spacer group, or may be carried out by a plural step to introduce a plural type of the spacer groups.

ii) A case where the "hydroxyl group" is an active hydroxyl group, and the hydroxyl group(s) is/are bound to the cyclic molecules via the spacer group.

In the case, a part of the hydroxyl groups bound to the cyclic molecule(s) via the spacer group may be inactivated in the step b) to obtain a polyrotaxane having a hydroxyl value having the above-described range. The spacer group may be a single type, or a plural type.

In the method ii), the "hydroxyl group bound via the spacer group" is formed in advance, and then a part of the hydroxyl groups are inactivated, thereby adjusting the hydroxyl value to a value having the above-described range.

With respect to the method for producing a polyrotaxane of the present invention, the roughly classified two methods i) and ii) are described above. However, the polyrotaxane of the present application which has the hydroxyl value having the above-described range can also be obtained by employing both of the methods i) and ii).

The step a) may vary depending on the presence or absence of the spacer group. In a case where no spacer group is contained, the step a) is a step of preparing a polyrotaxane, and the step a) can be carried out by a conventional known technique.

In a case where the hydroxyl group is present via the spacer group, a step of introducing the spacer groups is comprised after the polyrotaxane preparation step.

The step of introducing the spacer group can be carried out, for example, by reacting a compound that can serve as a source of the spacer group and the hydroxyl group with the hydroxyl group, depending on the spacer group introduced.

The compound that can serve as a source of the spacer group and the hydroxyl group can be selected depending on the spacer group introduced. Examples of the compound that can serve as a source of the spacer group and the hydroxyl group may include, but are not limited to, propylene oxide, 1,2-butylene oxide, glycidyl methyl ether, glycidyl ethyl ether, glycidyl propyl ether, glycidyl isopropyl ether, ε-caprolactone, γ-butyrolactone, δ-valerolactone, lactide, and a polymer or copolymer of any one of these compounds.

The step b) is a step of mixing and reacting the compound, which can serve as a source of the group having an ability to inactivate a hydroxyl group that is converted to a group having an ability to inactivate a hydroxyl group, to and with the polyrotaxane to inactivate a part of the hydroxyl groups.

Examples of the source of the group having an ability to inactivate a hydroxyl group may include, but are not limited to, acetic acid, acetic acid anhydride, propionic acid, propionic acid anhydride, butyryl chloride, octanoyl chloride, 2-ethylhexanoyl chloride, butyl isocyanate, octyl isocyanate, cyclohexyl isocyanate, dodecyl isocyanate and 2-ethylhexyl isocyanate.

Although the conditions for the step b) depend on the polyrotaxane used, the compound that serves as a source of the group having an ability to inactivate a hydroxyl group, and the like, the step b) may be carried out, for example, in a solvent at ambient temperature to 150° C. under ambient pressure in the presence of a catalyst and a condensing agent.

<Method for Producing a Thermoset Crosslinked Body>

The present application discloses a thermoset crosslinked body.

The method comprises the step of mixing the above-described polyrotaxane with a material which reacts with a hydroxyl group(s) of the polyrotaxane, to cure; and reacting the resultant by applying heat; to obtain the thermoset crosslinked body.

As the heat applied in the step, the step may be carried out in the condition, for example, from ambient temperature to 150° C., depending on characteristics of the polyrotaxane used, the material used and the like.

The polyrotaxane according to the present invention, the thermosetting composition according to the present invention, and/or the thermoset crosslinked body according to the present invention, or a material, crosslinked body, and/or body obtained by using them can apply to various application because of the characteristics thereof. Examples of the application may include, but are not limited to, pressure-sensitive adhesives and adhesives, scratch-resistant films, anti-vibration, damping, and isolation materials, paints, coating agents, sealants, ink additives and binders, electrical insulation materials, electrical and electronic component materials, optical materials, friction control agents, cosmetic materials, rubber additives, foam materials, resin modifying and toughening agents, rheology control agents, thickeners, fibers, medical biomaterials, mechanical and automotive materials, building materials, and clothing and sporting goods, and the like.

EXAMPLES

Hereinafter, the present invention will be described in more detail by using, but not limited to, following examples.
Analytical Device for Each Compound
The $^1$H-NMR measurement was determined by 400 MHz JEOL JNM-AL400 (manufactured by JEOL Ltd.).

The measurement of the molecular weight and the molecular weight distribution was carried out by using TOSOH HLC-8220 GPC instrument. The measurement was carried out under the conditions: column: TSK guard column Super AW-H and TSKgel Super AWM-H (two columns are linked); elution solution: dimethylsulfoxide (DMSO)/ 0.01 M LiBr; column oven: 50° C.; flow rate: 0.5 ml/min; sample concentration of about 0.2 wt/vol %; injection amount: 20 μl; pre-treatment: filtration using a 0.2 μm filter; and the standard molecular weight: PEO.

Infrared spectroscopy (IR) was determined by Nicolet 6700 FT-IR.

The measurement of the hydroxyl value and the acid value was determined by the method according to JIS 0070-1992.

The gas chromatogram (GC) was determined by GC-2014 manufactured by SHIMADZU CORPORATION.

Synthesis Example 1: Preparation of Unmodified Polyrotaxane X1

The polyrotaxane (hereinafter referred to as simply "APR35") formed from linear molecule: polyethylene glycol (Mw: 35,000); cyclic molecule: α-cyclodextrin (hereinafter referred to as simply "α-CD"); capping groups: adamantane groups) was prepared according to a manner described in WO2005/052026.

Furthermore, an inclusion amount of APR35 calculated from 1H-NMR analysis was determined as 27%. In this regard, the inclusion amount, which is defined as an amount at which the cyclic molecules can be included at maximum when the linear molecule has the cyclic molecules included in a skewered manner, and the amount at maximum is normalized to be 1 (see, Macromolecules 1993, 26, 5698-5703, whole contents of which are incorporated herein by reference).

The weight average molecular weight Mw determined by GPC was 145,000.

Synthesis Example 2: Preparation of Unmodified Polyrotaxane X2

The polyrotaxane X2 was synthesized in a manner similar to the synthesis example 1, except that 35,000 of the weight average molecular weight of polyethylene glycol as the linear molecule, which was used in the synthesis example 1, was changed to 11,000.

An inclusion amount of X2 calculated from 1H-NMR analysis was determined as 33%.

The weight average molecular weight Mw determined by GPC was 43,000.

Synthesis Example 3: Preparation of Unmodified Polyrotaxane X3

The polyrotaxane X3 was synthesized in a manner similar to the synthesis example 1, except that 35,000 of the weight average molecular weight of polyethylene glycol as the linear molecule, which was used in the synthesis example 1, was changed to 20,000.

An inclusion amount of X3 calculated from 1H-NMR analysis was determined as 33%.

The weight average molecular weight Mw determined by GPC was 70,000.

Synthesis Example 4: Preparation of Modified Polyrotaxane Y1

The polyrotaxane Y1 was obtained by further hydroxypropylating a part of OH groups in α-CD of the polyrotaxane X1 obtained in the synthesis example 1. The polyrotaxane Y1 was prepared in a manner similar to the method described in WO2005-080469, whole contents of which are incorporated herein by reference.

An inclusion amount of Y1 calculated from 1H-NMR analysis was determined as 27%, and an introduction rate of hydroxylpropyl groups of Y1 calculated from 1H-NMR analysis was determined as 48%.

The weight average molecular weight Mw determined by GPC was confirmed as 150,000.

Synthesis Example 5: Preparation of Modified Polyrotaxane Y2

The polyrotaxane Y2 was obtained by further hydroxypropylating a part of OH groups in α-CD of the polyrotaxane X2 obtained in the synthesis example 2. The polyrotaxane Y2 was prepared in a manner similar to the method described in WO2005-080469.

An inclusion amount of Y2 calculated from 1H-NMR analysis was determined as 33%, and an introduction rate of hydroxylpropyl groups of Y1 calculated from 1H-NMR analysis was determined as 47%.

The weight average molecular weight Mw determined by GPC was confirmed as 57,000.

Synthesis Example 6: Modified Polyrotaxane Z1

In a three-necked flask, 20 g of the modified polyrotaxane Y1 produced in Synthesis Example 4 was charged, and 90 g of ε-caprolactone was introduced into the flask while flowing nitrogen slowly. The resultant was stirred homogeneously at 130° C. for 60 minutes using a mechanical stirrer, then a solution (a 50 wt % solution) of 0.6 g of tin 2-ethylhexanoate in toluene that had been diluted previously was added thereto to react for 5 hours, followed by removing the solvent, to obtain 113 g of a reaction product (in which polycaprolactone groups are introduced in the modified polyrotaxane Y1).

IR measurement observed a peak attributed to an ester at 1736 cm$^{-1}$. The measurement by GPC found that the weight average molecular weight Mw was 586,800 and that the molecular weight distribution Mw/Mn was 1.3.

The hydroxyl value was 78 mgKOH/g.

The solvent was removed, to yield a polyrotaxane having polycaprolactone-modified side chains as a solid material, "a modified polyrotaxane Z1".

Synthesis Example 7: Modified Polyrotaxane Z2

90 g of a reaction product (in which polycaprolactone groups were introduced into the modified polyrotaxane Y2) was obtained in a manner similar to the production of the modified polyrotaxane Z1, except that 20 g of the modified polyrotaxane Y2 obtained in Synthesis Example 5 and 70 g of ε-caprolactone were used.

IR measurement observed a peak attributed to an ester at 1736 cm$^{-1}$. The measurement by GPC found that the weight average molecular weight Mw was 186,800 and the molecular weight distribution Mw/Mn was 1.2.

The hydroxyl value was 85 mgKOH/g.

The solvent was removed, to yield a polyrotaxane having polycaprolactone-modified side chains as a solid material, "a modified polyrotaxane Z2".

Example A1: Preparation of Polyrotaxane P1-1

Into a reaction vessel, 100 g of the modified polyrotaxane Z2 that had been dried under reduced pressure at 100° C. for 2 hours and 285 g of toluene were introduced, and then, dissolved together. Thereinto, 3.8 g of butyl isocyanate (manufactured by Tokyo Chemical Industry Co., Ltd.) was slowly added dropwise while flowing nitrogen, and then a solution of 4 mg of dibutyltin dilaurate in 1 ml toluene which had been diluted previously was introduced. The reaction temperature was adjusted to 100° C., and the reaction was continued for 18 hours. The consumption of isocyanate groups was confirmed by IR on the basis of the disappearance of a peak at around 2260 cm$^{-1}$. Toluene was removed, to obtain a polyrotaxane P1-1.

The weight average molecular weight was 190,000.

The hydroxyl value was 55 mgKOH/g.

Example A2: Preparation of Polyrotaxane P1-2

A polyrotaxane P1-2 was obtained in a manner similar to Example A1, except that 6.4 g of butyl isocyanate (manufactured by Tokyo Chemical Industry Co., Ltd.) was used instead of 3.8 g.

The weight average molecular weight was 191,000.

The hydroxyl value was 42 mgKOH/g.

Example A3: Preparation of Polyrotaxane P1-3

A polyrotaxane P1-3 was obtained in a manner similar to Example 1, except that 9.2 g of butyl isocyanate (manufactured by Tokyo Chemical Industry Co., Ltd.) was used instead of 3.8 g in Example A1. In Example A3, the solution obtained after the reaction was poured to 3-times volume of isopropyl alcohol (IPA), followed by purifying a solid substance while precipitating the solid substance, washing the solid substance by decantation, washing with IPA, collecting the solid substance, and then drying the solid substance, to obtain the polyrotaxane P1-3.

The weight average molecular weight was 193,000.

The hydroxyl value was 30 mgKOH/g.

Example A4: Preparation of Polyrotaxane P1-4

A polyrotaxane P1-4 was obtained in a manner similar to Example A3, except that 13.7 g of butyl isocyanate (manufactured by Tokyo Chemical Industry Co., Ltd.) was used.

The weight average molecular weight was 198,000.

The hydroxyl value was 20 mgKOH/g.

Comparative Example A1: Preparation of Polyrotaxane P1-5

A polyrotaxane P1-5 was obtained in a manner similar to Example A3, except that 18.3 g of butyl isocyanate (manufactured by Tokyo Chemical Industry Co., Ltd.) was used.

The weight average molecular weight was 197,000.

The hydroxyl value was 9 mgKOH/g.

Example B1: Preparation of Polyrotaxane P2-1

Into a reaction vessel, 100 g of the modified polyrotaxane Z2 that had been dried under reduced pressure at 100° C. for 2 hours and 50 g of toluene were introduced, and then dissolved together. Thereinto, 6.4 g of cyclohexyl isocyanate (manufactured by Tokyo Chemical Industry Co., Ltd.) was added dropwise slowly while flowing nitrogen, and then a solution of 4 mg of dibutyltin dilaurate in 1 ml of toluene which had been diluted was introduced. The reaction temperature was adjusted to 100° C., and the reaction was continued for 18 hours. The consumption of isocyanate groups was confirmed by IR on the basis of the disappearance of a peak at around 2260 cm$^{-1}$. Toluene was removed, to obtain a polyrotaxane P2-1.

The weight average molecular weight was 186,000.
The hydroxyl value was 60 mgKOH/g.

Example B2: Preparation of Polyrotaxane P2-2

A polyrotaxane P2-2 was obtained in a manner similar to Example B1, except that 8.0 g of cyclohexyl isocyanate (manufactured by Tokyo Chemical Industry Co., Ltd.) was used instead of 6.4 g.
The weight average molecular weight was 181,000.
The hydroxyl value was 48 mgKOH/g.

Example B3: Preparation of Polyrotaxane P2-3

A polyrotaxane P2-3 was obtained in a manner similar Example B1, except that 14.4 g of cyclohexyl isocyanate (manufactured by Tokyo Chemical Industry Co., Ltd.) was used instead of 6.4 g.
The weight average molecular weight was 186,000.
The hydroxyl value was 21 mgKOH/g.

Example C1: Preparation of Polyrotaxane P3-1

Into a reaction vessel, 1 g of the unmodified polyrotaxane X3, 7 ml of DMF and 3 ml of DBU were introduced, and then, dissolved together. Thereinto, 0.5 ml of butyl isocyanate (55 mol % relative to the amount of hydroxyl groups in the unmodified polyrotaxane X3) was added dropwise slowly while flowing nitrogen, and the reaction was carried out at room temperature for 24 hours. Subsequently, the reaction solution was neutralized with 3 ml of acetic acid, the resultant reaction solution was poured into IPA to cause the precipitation of a solid substance, and the solid substance was washed with IPA several times, to yield a butylcarbamoyl-modified polyrotaxane. The measurement of the hydroxyl value of the polyrotaxane found that the hydroxyl value was 247 mgKOH/g.

Subsequently, 1 g of the butylcarbamoyl-modified polyrotaxane, 4.5 g of ε-caprolactone and 3000 ppm of tin 2-ethylhexanoate were introduced into a reaction vessel, and then the reaction was carried out at 130° C. for 5 hours. The consumption of ε-caprolactone was confirmed by GC, and then the solvent was removed, to yield a graft form of the butylcarbamoyl-modified polyrotaxane. In this manner, a polyrotaxane P3-1 (5.5 g) was obtained, which had such a structure that polycaprolactone groups were introduced into the butylcarbamoyl-modified polyrotaxane.
The weight average molecular weight was 285,000.
The hydroxyl value was 58 mgKOH/g.

Synthesis Example 8: Preparation of Material B-1 Having at Least Two Lactone Isocyanate Groups as Material (B)

2.15 g of 1,3-bis(isocyanatomethyl)cyclohexane (manufactured by Tokyo Chemical Industry Co., Ltd.) was dissolved in 4.0 g of methyl ethyl ketone (MEK), then 3.85 g of polycarbonate diol having a number average molecular weight Mn of 800 (manufactured by Asahi Kasei Chemicals Corporation) was added dropwise to the solution while stirring the solution at 80° C., and then the resultant solution was stirred for 3 hours, to yield a polycarbonate B-1 which had isocyanate reactive groups respectively at both ends. The amount of isocyanate groups in the solution was determined by titration, and it was found that the amount was 5.2 wt %.

Synthesis Example 9: Preparation of D2 Having Polycaprolactone Polyol in β-CD Side Chain Into a three-necked flask, 10 g of β-CD (Casavol W7M, manufactured by Wacker Chemie AG) in which some of hydroxyl groups had been hydroxypropylated) and 80 g of ε-caprolactone were introduced while slowly flowing nitrogen. The resultant was stirred homogeneously at 130° C. for 60 minutes using a mechanical stirrer, then a solution of 0.4 g of tin 2-ethylhexanoate in toluene (a 50 wt % solution) that had been diluted previously was added thereto, then the reaction was carried out for 15 hours, and then the solvent was removed, to yield 70 g of a reaction product D2 (in which polycaprolactone groups were introduced into the hydroxyl groups in R-CD). The weight average molecular weight Mw determined by GPC was 11,000, and the molecular weight distribution Mw/Mn was 1.4. The hydroxyl value was 75 mgKOH/g.

Example E1: Preparation of Thermoset Body F1 and Measurement of the Elongation Rate and Breaking Strength of the Thermoset Body The polyrotaxane P1-1 obtained in Example A1, the material B-1 obtained in Synthesis Example 8, other material D1 (a polycarbonate diol (number molecular weight: 800, manufactured by Asahi Kasei Chemicals Corporation)), a catalyst (dibutyltin dilaurate) and a solvent (toluene) were mixed together in amounts expressed in parts by weight in Table 1, to yield a thermosetting composition E1.

The thermosetting composition E1 was applied onto a glass substrate that had been treated with a release agent, and was then heated at 100° C. for 1 hour, to cure the composition, and simultaneously to remove the solvent. Subsequently, the film was detached, to yield a thermoset body F1 having a thickness of 100 to 200 µm. The thermoset body F1 was shaped into a dumbbell-shaped article which was used as a sample for a tensile test.

The elongation rate and the breaking strength of the thermoset body F1 were measured with a tensile test machine Texture Analyzer plus XTPL/1 (manufactured by Eko Instruments Co., Ltd.). More specifically, the value of breaking strength, the value of a stress at 100% elongation and the value of a ratio (fold(s)) therebetween were determined from a stress-(elongation degree) curve. The results are shown in Table 1.

Examples E2 to E11: Preparation of Thermoset Bodies F2 to F11 and Measurement of Elongation Rate and Breaking Strength of the Thermoset Bodies The components shown in Table 1 were mixed together in amounts expressed in part(s) by mass in Table 1. In this manner, thermosetting compositions E2 to E11 were obtained.

Thermoset bodies F2 to F11 were obtained in a manner similar to Example E1 using the thermosetting compositions E2 to E11, respectively.

With respect to each of the thermoset bodies F2 to F1, elongation rate and breaking strength were measured in a manner same as Example E1. The results are shown in Table 1.

Comparative Examples CE1 to CE5

The components shown in Table 1 were mixed together in amounts expressed in part(s) by mass in Table 1. In this manner, thermosetting compositions CE1 to CE5 were obtained. Thermoset bodies CF1 to CF5 were also obtained in a manner similar to Example E1 using the thermosetting compositions CE1 to CE5, respectively, which are shown in Table 1.

With respect to each of the thermoset bodies CF1 to CF5, elongation rate and breaking strength were measured in a manner same as Example E1. The results are shown in Table 1.

It was shown that the thermoset bodies F1 to F1 had higher elongation rate and higher strength, since the polyrotaxanes of the present invention were used. More specifically, it was shown that the thermoset bodies had higher elongation rate at lowest 650% that was achieved in Example E11. It was also shown that the tensile break strength of each of the thermoset bodies was 6.1 times (Example E4) of the stress at the 100% elongation and therefore the thermoset bodies had higher strength while keeping the flexibility thereof.

On the other hand, Comparative Examples CE1 to CE5 show that, when the polyrotaxanes of the present invention were not used, the elongation rates were lower, and that the levels of the strength were lower. It was also shown that the thermoset bodies cannot achieve both of flexibility and strength, since the ratios of the tensile break strength to the stress at the 100% elongation were lower.

TABLE 1

| Composition | | Ex. E1 | Ex. E2 | Ex. E3 | Ex. E4 | Ex. E6 | Ex. E7 | Ex. E8 | Ex. E9 |
|---|---|---|---|---|---|---|---|---|---|
| Polyrotaxane | P1-1 (55) | 100 | | | | | | | |
|  | P1-2 (42) |  | 100 | | | | | | |
| The number | P1-3 (30) |  |  | 100 | | | | | |
| in ( ) | P1-4 (20) |  |  |  | 100 | | | | |
| represents | P1-5 (9) |  |  |  |  | | | | |
| hydroxyl | P2-1 (60) |  |  |  |  | 100 | | | |
| value | P2-2 (48) |  |  |  |  |  | 100 | | |
|  | P2-3 (21) |  |  |  |  |  |  | 100 | |
|  | P3-1 (58) |  |  |  |  |  |  |  | 100 |
|  | Z1 (78) |  |  |  |  |  |  |  | |
|  | Z2 (85) |  |  |  |  |  |  |  | |
| Reactive | B-1 | 298 | 277 | 267 | 244 | 298 | 313 | 244 | 331 |
| material | D1 | 91.4 | 91.4 | 91.4 | 91.4 | 91.4 | 91.4 | 91.4 | 91.4 |
|  | D2 |  |  |  |  |  |  |  | |
| Crosslinking agent: 1,3-Bis(isocyanatomethyl)cyclohexane | | | | | | | | | |
| Catalyst: Dibutyltin dilaurate | | 0.03 | 0.03 | 0.03 | 0.03 | 0.03 | 0.03 | 0.03 | 0.03 |
| Solvent (toluene) | | 132 | 132 | 132 | 132 | 132 | 132 | 132 | 132 |
| Properties of cured body | | | | | | | | | |
| Elongation rate (%) | | 1000 | 915 | 740 | 690 | 750 | 760 | 680 | 830 |
| Stress at 100% elongation (MPa) | | 1.0 | 0.95 | 1.2 | 0.82 | 1.5 | 1.5 | 0.75 | 1.1 |
| Tensile break strength (MPa) | | 17.3 | 19.2 | 10.7 | 5.0 | 21.3 | 14.3 | 4.9 | 10.5 |
| Tensile break strength/ Stress at 100% elongation | | 17.3 | 20.2 | 8.9 | 6.1 | 14.2 | 9.5 | 6.5 | 9.5 |

| Composition | | Ex. E10 | Ex. E11 | Comp. Ex. CE1 | Comp. Ex. CE2 | Comp. Ex. CE3 | Comp. Ex. CE4 | Comp. Ex. CE5 |
|---|---|---|---|---|---|---|---|---|
| Polyrotaxane | P1-1 (55) | | | | | | | |
|  | P1-2 (42) | 100 | 25 | | | | | |
| The number | P1-3 (30) | | | | | | | |
| in ( ) | P1-4 (20) | | | | | | | |
| represents | P1-5 (9) | | | | | | | 100 |
| hydroxyl | P2-1 (60) | | | | | | | |
| value | P2-2 (48) | | | | | | | |
|  | P2-3 (21) | | | | | | | |
|  | P3-1 (58) | | | | | | | |
|  | Z1 (78) | | | | | 100 | | |
|  | Z2 (85) | | | 100 | 100 | | | |
| Reactive | B-1 | | 363 | 347 | | 347 | 376 | 110 |
| material | D1 | 269 | 91.4 | 91.4 | 243 | 91.4 | | 91.4 |
|  | D2 | | | | | | 100 | |
| Crosslinking agent: 1,3-Bis(isocyanatomethyl)cyclohexane | | 100 | | | 81.8 | | | |
| Catalyst: Dibutyltin dilaurate | | 0.03 | 0.03 | 0.03 | 0.03 | 0.03 | 0.03 | 0.03 |
| Solvent (toluene) | | 169 | 82 | 132 | 196 | 132 | 132 | 132 |

TABLE 1-continued

| Properties of cured body | | | | | | | |
|---|---|---|---|---|---|---|---|
| Elongation rate (%) | 660 | 650 | 320 | 180 | 490 | 465 | 470 |
| Stress at 100% elongation (MPa) | 1.3 | 1.2 | 2.6 | 2.7 | 2.4 | 0.70 | 0.80 |
| Tensile break strength (MPa) | 15.8 | 14.3 | 11.0 | 6.3 | 11.5 | 2.4 | 2.9 |
| Tensile break strength/ Stress at 100% elongation | 12.1 | 11.9 | 4.2 | 2.3 | 4.8 | 3.4 | 3.6 |

What is claimed is:

1. A thermosetting composition comprising:
   A) a polyrotaxane comprising capping groups each locating at each end of a pseudopolyrotaxane, which has a linear molecule and a cyclic molecule(s) in which the linear molecule is included in a cavity (cavities) of the cyclic molecule(s) in a skewered manner, in order to prevent the dissociation of the cyclic molecule(s),
   wherein the cyclic molecule comprises a group having an ability to inactivate a hydroxyl group and a hydroxyl group bonded through a spacer group, and the polyrotaxane has a hydroxyl value of 10 to 65 mgKOH/g; and
   B) a material which is capable of reacting with the hydroxyl group of the A) polyrotaxane to cure,
   wherein the material comprises one selected from the group consisting of polycarbonates with terminal isocyanate modification, polypropylene glycol with terminal isocyanate modification, a polyacryl ester having an isocyanate side chain, polycarbonates with terminal isothiocyanate modification, a polyacrylic acid ester having an isothiocyanate group in a side chain, an acid-anhydride-modified polypropylene, polyethylene glycol with terminal epoxy-modification, and acryl polymers modified with carboxylic acid group.

2. The composition according to claim 1, wherein an amount of the A) polyrotaxane is 2 to 35% by weight based on 100% by weight of the total nonvolatile components of the composition.

3. The composition according to claim 1, wherein the spacer group has a group derived from polycaprolactone.

4. The composition according to claim 1, wherein the spacer group further has a group derived from hydroxypropyl.

5. The composition according to claim 1, wherein the group having an ability to inactivate a hydroxyl group is selected from the group consisting of alkyl ester groups, alkyl carbamoyl groups, and alkyl ether groups, wherein the alkyl of each of the alkyl carbamoyl groups independently represents a linear, branched or cyclic alkyl group having 1 to 12 carbon atoms.

6. The composition according to claim 1, wherein the B) material further comprises a b) second compound having a number average molecular weight of 350 or more and having at least two groups selected from a hydroxyl group, an amino group, and a thiol group.

7. The composition according to claim 6, further comprises C) a crosslinking agent.

8. The composition according to claim 7, wherein the 2) second compound is a polyol having two or more hydroxyl groups, and the C) crosslinking agent has two or more isocyanate groups.

9. A thermoset crosslinked body formed from the composition according to claim 1.

10. A method for producing a thermoset crosslinked body, comprising the steps of:

a) preparing a polyrotaxane, in which capping groups each locates at each end of a pseudopolyrotaxane, which has a linear molecule and a cyclic molecule(s) having a hydroxyl group(s) in which the linear molecule is included in a cavity (cavities) of the cyclic molecule(s) in a skewered manner, in order to prevent the dissociation of the cyclic molecule(s),
   b) mixing and reacting a compound, which serves as a source of a group having an ability to inactivate a hydroxyl group that is converted to a group having an ability to inactivate a hydroxyl group, to and with the polyrotaxane to inactivate a part of the hydroxyl group (s);
   to obtain a polyrotaxane having a hydroxyl value of 10 to 65 mgKOH/g, and
   d) mixing the obtained polyrotaxane with a material which reacts with a hydroxyl group(s) of the polyrotaxane, to cure, and reacting the resultant by applying heat;
   to obtain the thermoset crosslinked body,
   wherein the material comprises one selected from the group consisting of polycarbonates with terminal isocyanate modification, polypropylene glycol with terminal isocyanate modification, a polyacryl ester having an isocyanate side chain, polycarbonates with terminal isothiocyanate modification, a polyacrylic acid ester having an isothiocyanate group in a side chain, an acid-anhydride-modified polypropylene, polyethylene glycol with terminal epoxy-modification, and acryl polymers modified with carboxylic acid group.

11. The method according to claim 10,
   wherein in the step a), the hydroxyl group is directly bound to a cyclic molecule;
   the method comprising, after the step b), the step of c) adding and reacting a compound, which reacts with a hydroxyl group other than a part of the hydroxyl groups and which becomes a source of the first spacer group and the hydroxyl group, to the system having the polyrotaxane obtained in the step b), to introduce the first spacer group and the hydroxyl group bound to the first spacer group, thereby to obtain the polyrotaxane having a hydroxyl value of 10 to 65 mgKOH/g.

12. The method according to claim 11, wherein the first spacer group has a group derived from polycaprolactone.

13. The method according to claim 11, wherein the first spacer group has a group derived from polycaprolactone and a group derived from hydroxypropyl.

14. The method according to claim 10, wherein in the step a), the hydroxyl group is bound to a cyclic molecule via a second spacer group.

15. The method according to claim 14, comprising, after the step b), the step of c) adding and reacting a compound, which reacts with a hydroxyl group other than a part of the hydroxyl groups and which becomes a source of the first spacer group and the hydroxyl group, to the system having the polyrotaxane obtained in the step b), to introduce the first spacer group and the hydroxyl group bound to the first spacer group, thereby to obtain the polyrotaxane having a hydroxyl value of 10 to 65 mgKOH/g.

16. The method according to claim 15, wherein the second spacer group has a group derived from hydroxypropyl, and the third spacer group has a group derived from polycaprolactone.

17. The method according to claim 14, wherein the second spacer group has a group derived from polycaprolactone.

18. The method according to claim 14, wherein the second spacer group has a group derived from polycaprolactone and a group derived from hydroxypropyl.

19. The composition according to claim 1, wherein the group having an ability to inactivate a hydroxyl group is selected from the group consisting of alkyl carbamoyl groups, wherein the alkyl of each of the alkyl carbamoyl groups independently represents a linear, branched or cyclic alkyl group having 1 to 12 carbon atoms, and which inactivate a part of hydroxyl groups directly bound to a cyclic molecule.

20. The method according to claim 10, wherein the hydroxyl group(s) is(are) directly bound to a cyclic molecule in the step a); and the group having an ability to inactivate a hydroxyl group is selected from the group consisting of alkyl carbamoyl groups, wherein the alkyl of each of the alkyl carbamoyl groups independently represents a linear, branched or cyclic alkyl group having 1 to 12 carbon atoms.

* * * * *